US009992020B1

(12) United States Patent
Garagnon et al.

(10) Patent No.: US 9,992,020 B1
(45) Date of Patent: Jun. 5, 2018

(54) ONLINE CHANGE OF ENCRYPTION ROOT KEYS IN A DISTRIBUTED DATABASE MANAGEMENT SYSTEM

(71) Applicant: SAP SE, Walldorf (DE)

(72) Inventors: Fabian Garagnon, Berlin (DE); Thomas Wenckebach, Berlin (DE)

(73) Assignee: SAP SE, Walldorf (DE)

( * ) Notice: Subject to any disclaimer, the term of this patent is extended or adjusted under 35 U.S.C. 154(b) by 0 days. days.

(21) Appl. No.: 15/356,938

(22) Filed: Nov. 21, 2016

(51) Int. Cl.
*H04L 9/08* (2006.01)
*H04L 9/16* (2006.01)
*G06F 21/64* (2013.01)
*G06F 11/14* (2006.01)
*G06F 17/30* (2006.01)

(52) U.S. Cl.
CPC ........ *H04L 9/0894* (2013.01); *G06F 11/1469* (2013.01); *G06F 17/30312* (2013.01); *G06F 21/64* (2013.01); *H04L 9/083* (2013.01); *H04L 9/16* (2013.01); *G06F 2201/80* (2013.01); *H04L 2209/24* (2013.01)

(58) Field of Classification Search
CPC ................ G06F 11/1469; G06F 21/64; G06F 17/30312; H04L 9/083; H04L 9/16; H04L 9/0894
See application file for complete search history.

(56) References Cited

U.S. PATENT DOCUMENTS

| 2008/0022361 A1* | 1/2008 | Bharadwaj .......... G06F 21/6209 726/2 |
| 2008/0098236 A1* | 4/2008 | Pandey ............... G06F 11/1464 713/189 |
| 2011/0261964 A1* | 10/2011 | Kahler ................. H04L 9/0825 380/286 |
| 2016/0154963 A1* | 6/2016 | Kumar ................ G06F 21/6209 713/189 |
| 2016/0344553 A1* | 11/2016 | Chen ....................... G06F 11/14 |
| 2017/0257214 A1* | 9/2017 | Stufflebeam .......... H04L 9/0891 |

OTHER PUBLICATIONS

Elaine Barker, Recommendation for Key Management Part 1: General, Jan. 2016, NIST Special Publication 800-57 Part 1, Revision 4, p. 1-160.*

* cited by examiner

*Primary Examiner* — Nelson Giddins
(74) *Attorney, Agent, or Firm* — Fish & Richardson P.C.

(57) ABSTRACT

A request is received to change a first, current encryption root key used to encrypt and decrypt a set of data in a database. A new, second encryption root key is generated. The second encryption root key is stored in a secured area in disk storage as a new current encryption root key. The first encryption root key is maintained in the secured area as a historical encryption root key. New root key version information that identifies the new, second encryption root key is generated and stored as current root key version information. A request is received to encrypt the set of data. The second encryption root key is identified as the current encryption root key based on the current root key version information. The second encryption root key is used to encrypt the set of data to create an encrypted set of data.

17 Claims, 5 Drawing Sheets

ONLINE CHANGE OF ENCRYPTION ROOT KEYS IN A DISTRIBUTED DATABASE MANAGEMENT SYSTEM

BACKGROUND

A database management system can be used to store relational data. The database management system can be transactional, meaning that a set of multiple database operations can be committed or rolled back as a single transaction. If a failure occurs before all of the multiple database operations have completed, the completed database operations will not have been permanently committed to the database. For security purposes, the database management system can encrypt stored data. When encrypted data is retrieved, the data can be decrypted before being used.

SUMMARY

The present disclosure describes methods and systems, including computer-implemented methods, computer program products, and computer systems for performing an online change of an encryption root key in a distributed database system.

In an implementation, a request is received to change a first, current encryption root key used to encrypt and decrypt a set of data in a database. A new, second encryption root key is generated. The second encryption root key is stored in a secured area in disk storage as a new current encryption root key. The first encryption root key is maintained in the secured area as a historical encryption root key. New root key version information that identifies the new, second encryption root key is generated and stored as current root key version information. A request is received to encrypt the set of data. The second encryption root key is identified as the current encryption root key based on the current root key version information. The second encryption root key is used to encrypt the set of data to create an encrypted set of data.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, an encryption root key of a database can be changed while the database is online. Second, a change to an encryption root key can be propagated to multiple sites in a distributed environment. Third, data can be successfully decrypted after a change to an encryption root key even if errors occur during the changing of the encryption root key, site propagation, or other database operations. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes performing an online change of an encryption root key in a distributed database system and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

A database management system can store data in pages, which can be encrypted using page keys. Page keys can be stored in an area of the database management system that is separate from the encrypted pages. The page keys can also be encrypted, using another key called a root key. The root key can be stored separately from the database management system. A root key can be stored separately from the database management system so that the root key can be stored on different file system partitions or in a hardware module, for example.

An organization may desire to change a root key periodically, for example, for security reasons. A change to the root key should be performed in a manner that ensures that encrypted data and a new root key are consistent, meaning that the encrypted page keys should be able to be decrypted using an available root key in any possible situation, such as in the event of a database failure, an interruption to the root key change process, or a disruption in system replication of root key changes in a distributed environment.

Changing the root key while the database management system is in an offline mode can ensure consistency of a new root key with the encrypted page keys. However, it may be desirable to keep a production database management system online and available, so an offline root key change may be unacceptable. An administrator may desire to change a root key due to possibility of the current root key being compromised, so the administrator may desire to update the root key as quickly as possible, including on distributed systems where a root key may need to be changed on multiple sites. Taking each site offline to change a root key on a respective site may result in an unacceptable amount of time to change all root keys in the distributed system.

An online root key change process can enable a root key to be changed, on a single site or on a distributed system, in a timely manner, while ensuring consistency of root keys with encrypted data. The root key change process can involve using multiple versions of root keys, including maintaining previously used root keys. Encryption and decryption of page keys, as well as backup and recovery processes, can be configured to handle the possibility of multiple root key versions.

Figure 1:
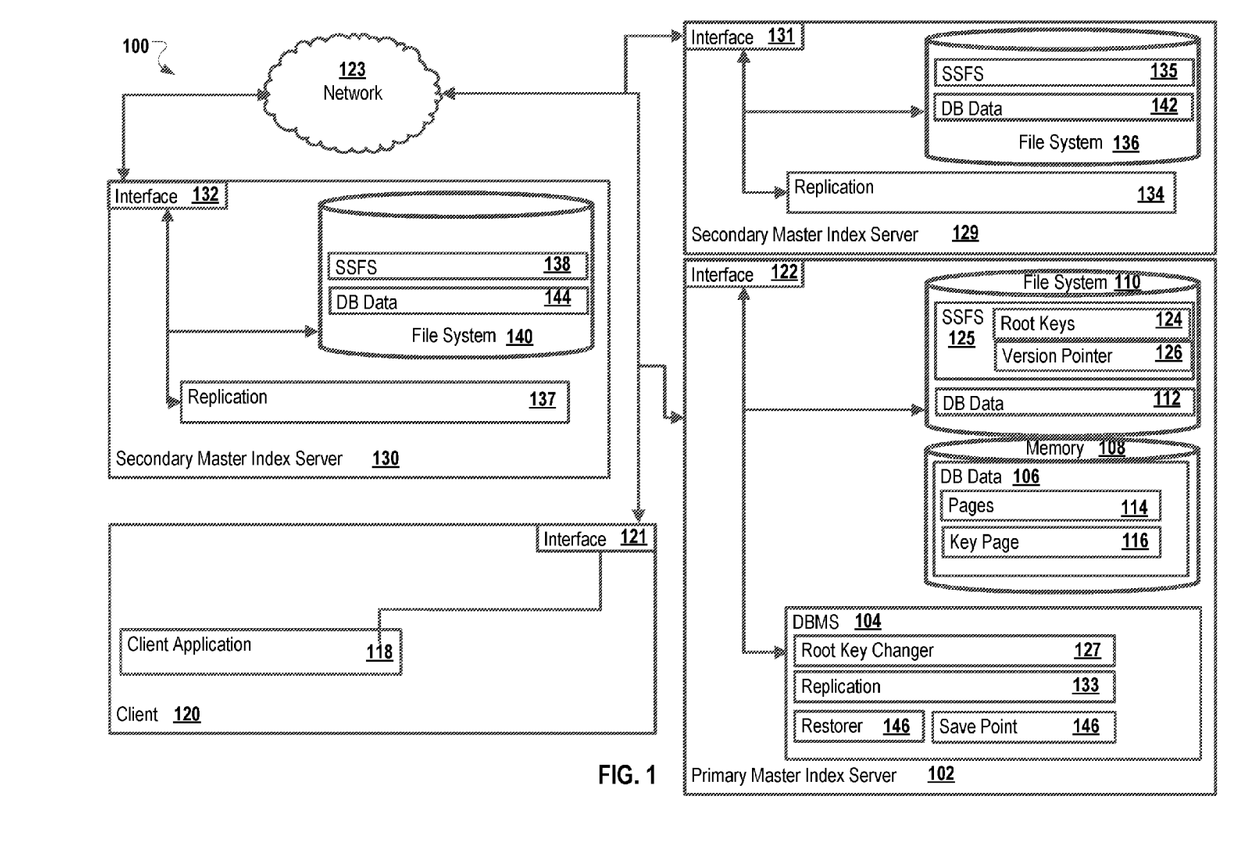
FIG. 1 is a high-level architectural block diagram illustrating an example distributed computing system (EDCS) for performing an online change of an encryption root key in a distributed database system, according to an implementation.

FIG. 1 is a high-level architectural block diagram illustrating an example distributed computing system (EDCS) 100 for performing an online change of an encryption root key in a distributed database system, according to an implementation. A primary master index server 102 can include a DBMS (DataBase Management System) 104. The DBMS 104 can be a relational database system that supports transactions. The DBMS 104 can be an in-memory database, with database data 106 being stored in memory 108. The DBMS 104 can include multiple services, running as operating system processes, with each service maintaining data in the database data 106. The database data 106 can reside in the memory 108 for performance reasons. For fallback in case of system failure, the database data 106 can be periodically written, by a save point component 108, to disk storage in a file system 110 (as stored database data 112), at regular consistent save points.

The database data 106 can include data pages 114. When the save point component 109 writes the database data 106 to the file system 110 at a save point, the data pages 114 can be automatically encrypted using page keys stored in a key page 116 as part of the save point operation. User and service data can be encrypted, for example, for security reasons, using the AES-256-CBC encryption algorithm or some other encryption algorithm. Encrypted page data stored in the file system 110 can be automatically decrypted, using the page keys, as part of a load process when the stored database data 112 is loaded back into the memory 108.

Page keys in the key page 116 can be valid for a certain range of save points. An administrator using a client application 118 on a client device 120 can submit a SQL statement to change the page keys included in the key page 116. Interfaces 121 and 122 can enable the client device 120 to communicate with the primary master index server 102, respectively, over a network 123.

The key page 116 can be encrypted using a meta-key called a root key. The root key can be stored in a root keys area 124 of a SSFS (Secure Storage in the File System) area 125 of the file system 110. The SSFS area 125 can be used to store other keys and other security-related information associated with the DBMS 104. In a multiple database containers configuration, each database can include a SSFS area 125. Consistency information for the SSFS area 125 can be stored in the database data 106 and can be used to detect manipulation or corruption of the SSFS area 125. For example, the consistency information can be used in a consistency check that can be performed upon startup of the database, backup of the database, or as part of a periodic consistency check.

The use of a hierarchy of keys (the meta-key root key and the page keys) can result in easier changing of keys, since the root key can be changed without requiring re-encryption of the data pages 114, as may be the case if only the page keys are changed. The root keys area 124 is stored in the SSFS area 125 rather than in the database data 106. A root key can be stored separately from the database data 106 so that the root key can be stored on different file system partitions or in a hardware module, for example. The root key can be retrieved from the root keys area 124 when the key page 116 is encrypted or decrypted.

As mentioned above, an administrator may desire to change a root key while the DBMS 104 is online, while ensuring that encrypted data is able to be decrypted even in the event of unplanned events, errors, or situations. To ensure that data is able to be decrypted after any possible situation, such as a database crash, an interruption to the root key change process, or a disruption in system replication in a distributed environment, multiple versions of a root key can be maintained in the root keys area 124. A version pointer 126 can include information that identifies a current version of the root key.

A given version of a root key can be distinguished from another version of the root key using a unique version number that is associated with the given version of the root key. A version number can be a suffix that is appended to or otherwise associated with a respective version of the root key. Other approaches can be used for creating uniquely identifiable root key versions. For example, a hash function can be used to create root key versions.

An administrator can issue a command, such as a SQL command, using the client application 118, to request that the current root key in the root keys area 124 be changed. The root key change command can be issued while the DBMS 104 is online, and completion of the root key change command can be performed while maintaining availability of the DBMS 104. In some implementations, a root key change process can also be performed automatically, such as on a periodic basis.

In response to the root key change command, a root key changer 127 in the DBMS 104 can generate a new root key value to be used for encryption of the key page 116. The new root key value can be generated using an algorithm that is specific to the type of encryption used by the DBMS 104. The root key changer 127 can write the new root key value to the root key area 124. The root key changer 127 can create a new version pointer that is to be associated with and identify the new root key value. The root key changer 127 can change the version pointer 126 to be the newly created version pointer. As described in more detail below, the root key changer 127 may wait until system replication has been acknowledged before overwriting the version pointer 126, when the primary master index server 102 is associated with one or more secondary systems.

The primary master index server 102 can be connected, over the network 123, to a secondary master index server 129. The primary master index server 102 can replicate data to the secondary master index server 129. The secondary master index server 129 can be connected to another secondary master index server 130. The secondary master index server 129, or the primary master index server 102, can replicate data to the secondary master index server 130. The secondary master index server 129 can be used for fallback capability if the primary master index server 102 fails. The secondary master index server 130 can provide further fallback capability. Interfaces 131 and 132 can enable the secondary master index servers 129 and 130 to communicate over the network 123, respectively.

After generating and writing the new root key value to the root key area 124 of the SSFS 125, a replication component 133 of the primary master index server 102 can propagate the SSFS 125 (or portions of the SSFS 125) to the secondary master index server 129 and wait for acknowledgement from the secondary master index server 129. A replication component 134 of the secondary master index server 129 can write the received SSFS information to a SSFS area 135 of a local file system 136. The secondary master index server 129 can propagate the received SSFS information to the secondary master index server 130 and wait for acknowledgement from the secondary master index server 130. A replication component 137 of the secondary master index server 130 can write the received SSFS information to a SSFS area 138 of a local file system 140.

The secondary master index server 130 can send an acknowledgement to the secondary master index server 129, and the secondary master index server 129 can send an acknowledgement to the primary master index server 102. The root key changer 127 can store the new version pointer as the version pointer 126 in the SSFS area 125. The new version pointer can be propagated to the secondary master index servers 129 and 130 using a process similar to the propagation of the new root key value. The two-phase propagation, described in more detail below with respect to FIG. 3, can protect against complications and error conditions that may occur during system replication. The propagated root keys can be used by the secondary master index servers 129 and 130 when encrypting data to be stored in database data 142 or 144, and when decrypting data retrieved from the database data 142 or 144, respectively.

The version pointer 126 identifies the new root key as the current root key. The current root key can be used by the DBMS 104 until another root key change command is received. The save point component 109 can use the new root key that is identified by the version pointer 126 to encrypt the key page 116 when the key page 116 is written to the file system 110 as part of the stored database data 112, at a next save point. When a restorer 146 performs a load process to load the stored database data 112 back into the memory 108, such as in response to a crash or otherwise upon system startup, the new root key can be used to decrypt the key page 116, so that the page keys included in the key page 116 can be used to automatically decrypt the stored database data 112 that is being loaded.

If a crash to the DBMS 104 has occurred, the version pointer 126 may or may not be referring to a root key that was last used to encrypt the key page 116. For example, the root key changer 127 may have generated and stored a new root key in the root keys area 124, and a crash may have occurred before the new version pointer was successfully written as the version pointer 126. When decrypting the key page 116, the restorer 146 or another component can use a checksum operation to validate the decryption. If the checksum operation fails, the restorer 146 or another component can re-attempt decryption using other versions of the root key, until a determination is made, by performing a successful checksum operation, which root key had been used to encrypt the key page 116. As described in more detail below, inconsistencies between encrypted data and a current root key can occur due to site replication, and multiple versions of root keys can be used in those situations to resolve the inconsistencies.

Other error conditions can be handled by maintaining multiple versions of root keys. For example, a root key can be changed, and the save-point component 109 can attempt to encrypt the key page 109 at a subsequent save point using the new root key. However, an error can happen during the save point and the save point transaction can be rolled back, and a prior version of the key page 116 can be re-stored. However, the prior version of the key page 116 may have been encrypted using the prior version of the root key. If the prior version of the root key is not included in the root keys area 124 (such as if only one root key is maintained in the root keys area 124), the prior version of the key page 116 may not be able to be decrypted. However, since the root keys area 124 does include multiple root key versions, including the prior root key version, the prior root key version can be identified and used to decrypt the prior version of the key page 116.

The SSFS area 125, as well as the stored database data 125, can be included in a backup of the file system 110. Portions of the file system 110 can be periodically backed up as an external backup using media separate from the primary master index server 102, for example. When creating the external backup, all root key versions included in the root keys area 124 and the version pointer 126 can be included in the external backup. When a recovery using the external backup is made, all root key versions included in the external backup can be written to the root keys area 124 and the backed-up version pointer can be written to the version pointer 126.

Although encryption and decryption of the key page 116 is described, the root keys 124 can be used to encrypt and decrypt other sets of data, such as database tables, logs, application-level keys, data backups, or any other set of data.

Figure 2:
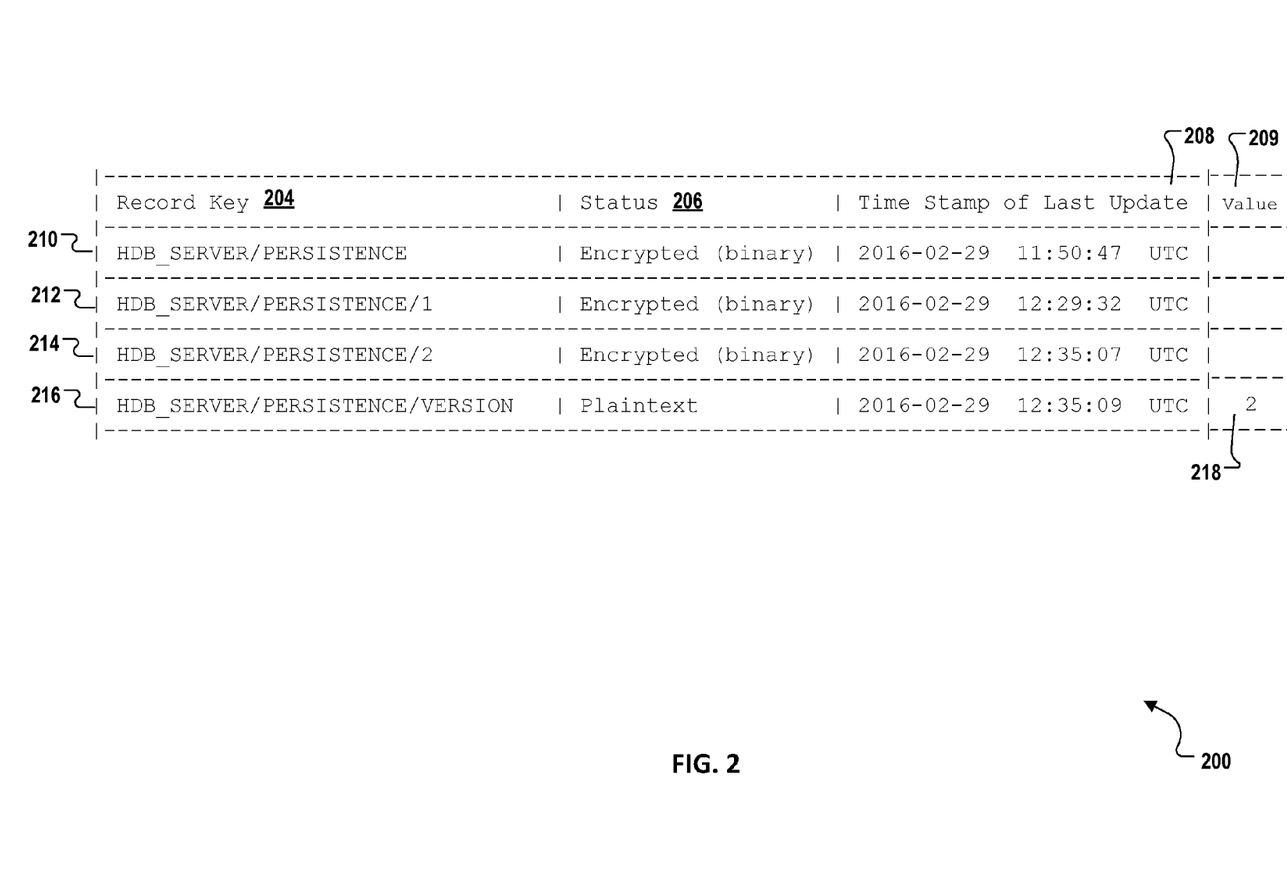
FIG. 2 is a table illustrating example root key information, according to an implementation.

FIG. 2 is a table 200 illustrating example root key information, according to an implementation. The table 200 can be stored, for example, in the root keys area 124 of the SSFS 125. The table 200 includes a record key column 204, a status column 206, a time stamp of last update column 208, and a value column 209. The value column 209 can store, for example, the value of a root key (not shown) or the value of a root key version pointer. The table 200 includes entries 210, 212, and 214 for first, second, and third root key versions. The status column 206 indicates that the first, second, and third root key versions are encrypted.

The table 200 includes a version pointer entry 216. The status column 206 indicates that the version pointer value for the version pointer entry 216 is plain text (e.g., not encrypted). In some implementations, the version pointer value is encrypted. A value 218 in the value column 209 for the version pointer entry 216 is two (e.g., corresponding to the highest version number (2) associated with the root key version entry 214). The value 218 indicates that the entry 214 corresponds to the current root key. The entries 210 and 212 correspond to previous versions of the root key. The entry 212 has a version of one and the entry 210 has no version shown which can be interpreted as a version of zero.

As described above, if a decryption operation fails, decryption can be reattempted using versions of the root key other than the current root key identified by the version pointer entry 216. For example, when versions are identified using successively larger integer version numbers (as shown in the table 200), an iteration can be performed, in which a decryption is attempted during each iteration, starting with the current root key identified by the value (two in this example) of the version pointer entry 216, with each subsequent attempted version being one less than the previous attempted version. With the example table 200, the root key associated with the entry 214 can be tried first, then the root key associated with the entry 212, and finally, the root key associated with the entry 210.

In some situations, there may be a root key version entry in the table 200 with a version identifier that is more than the value of the version pointer entry 216, such as due to transitioning to a secondary server and back to a primary server after a crash and restoration of the primary server. A decryption attempt process can include identifying and using the root key versions that are greater than the current root key version identified by the version pointer entry 216.

In some implementations, root key versions may be identified using some other approach than integer version identifiers. For example, each root key version may be identified using a hash value. Root key versions identified using hash key values may not be ordered according to creation time in the table 200. A decryption attempt process can include identifying all possible root key versions (for example, as an unordered list), and iterating through the possible root key versions until a successful decryption operation is performed.

Figure 3:
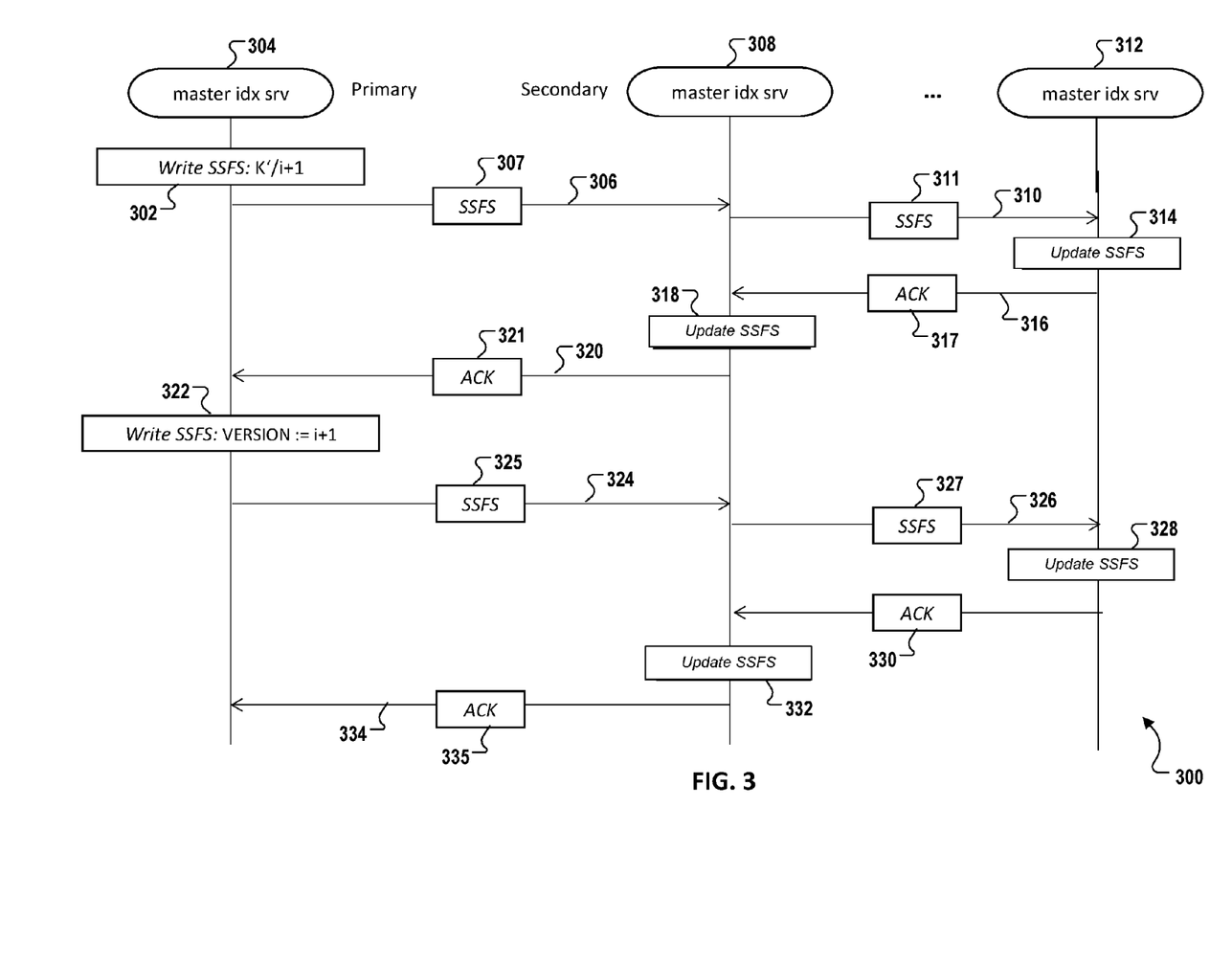
FIG. 3 is a flowchart illustrating an example method for system replication of root key information, according to an implementation.

FIG. 3 is a flowchart illustrating an example method 300 for system replication of root key information, according to an implementation. At 302, a primary master index server 304 generates a new root key value (represented as "K'/i+1") and writes the new root key value to a SSFS area of the primary master index server 304. The new root key value can be stored in a SSFS area of the primary index server 304 in an inactive state until the primary master index server 304 receives acknowledgement that the new root key value has been received and stored at secondary master index servers that may be connected to the primary master index server 302. A version pointer may not point at the new root key value until the acknowledgement is received.

At 306, the primary master index server 302 sends SSFS data 307 to a secondary master index server 308. The SSFS data 307 can be just the new root key value, the entire SSFS area of the primary master index server 304, or some other portion of the primary master index server 304 that includes the new root key value.

At 310, the secondary master index server 308 forwards the received SSFS data (as SSFS data 311) to another secondary master index server 312. At 314, the other secondary master index server 312 updates data in an SSFS area of the other secondary master index server 312 using the SSFS data received from the secondary master index server 308. The other secondary master index server 312 can also update one or more SSFS areas in memory of the other secondary master index server 312, such as temporary memory areas that are copies of information included in the SSFS area of the other secondary master index server 312.

At 316, the other secondary master index server 312 sends an acknowledgement 317 of the SSFS update performed on the other secondary master index server 312 to the secondary master index server 308. At 318, the secondary master index server 308 updates data in an SSFS area of the secondary master index server 308 using the SSFS data received from the primary master index server 304. The secondary master index server 308 can also update one or more SSFS areas in memory of the secondary master index server 308, such as temporary memory areas that are copies of information included in the SSFS area of the secondary master index server 308.

At 320, the secondary master index server 308 sends an acknowledgement 321 of the SSFS update performed on the secondary master index server 308 to the primary master index server 304.

At 322, the primary master index server 304 increments a version pointer that points to a current root key version stored in the SSFS of the primary master index server 304. The incrementing of the version pointer operation is represented by "VERSION:=i+1", where "i" represents a value of a current version identifier. The primary master index server 304 can propagate the new version pointer. The primary master index server 304 can use the root key version that is identified by the new version pointer when encrypting and decrypting key pages on the primary master index server 304.

At 324, the primary master index server 302 sends SSFS data 325 (or just the new version pointer, or a portion of the SSFS data 325 that includes the new version pointer) to the secondary master index server 308. At 326, the secondary master index server 308 forwards the received SSFS data (or the received new version pointer), shown as SSFS data 327, to the other secondary master index server 31.

At 328, the other secondary master index server 312 updates data in the SSFS area of the other secondary master index server 312 using the new version pointer information received from the secondary master index server 308 in step 326. The secondary master index server 312 can use the root key version that is identified by the new version pointer information when encrypting and decrypting key pages on the secondary master index server 312. At 330, the other secondary master index server 312 sends an acknowledgement 331 of the second SSFS update performed on the other secondary master index server 312 to the secondary master index server 308.

At 332, the secondary master index server 308 updates data in the SSFS area of the secondary master index server 308 using the SSFS data received from the primary master index server 304 in step 324. The secondary master index server 308 can use the root key version that is identified by the new version pointer information when encrypting and decrypting key pages on the secondary master index server 308. At 334, the secondary master index server 312 sends an acknowledgement 335 of the second SSFS update performed in the secondary master index server 308 to the primary master index server 304.

The storing of multiple versions of root keys on the primary master index server 304, the secondary master index server 308, and the secondary master index server 312 can result in resolving potential error situations and inconsistencies. The overall root key replication procedure may not complete successfully, for example. The primary master index server 304 can crash after writing the new version identifier in step 322 but before successfully sending the SSFS information 325 including the new version identifier in step 324. The primary master index server 304 may have begun using the new root key version before the crash, but the secondary master index servers 308 and 312 may have received the new root key but not the new root key version identifier. The secondary master index server 308 can take over as a new primary server after the primary master index server 304 crashes, and can maintain the root key received from the primary master index server 304 in step 306, even though the secondary master index server 308 may not use that root key. The primary master index server 304 may obtain the root key it provided to the secondary master index server 308 when the primary master index server 304 is restored again as the primary server, and can use that root key to decrypt any data it encrypted using that key before the primary master index server 304 crashed.

As another example, the primary master index server 304 can be become a new secondary server after the secondary master index server 308 becomes a new primary server, when the primary master index server 304 comes back online. As part of becoming the new secondary server, the primary master index server 304 can receive SSFS information from the secondary master index server 308. The SSFS information received from the secondary master index server 308 can include any root keys the primary master index server 304 had previously used, since the primary master index server 304 does not use a root key sent to the secondary master index server 308 until after receiving the acknowledgement 321. Other error conditions and inconsistencies can be resolved by maintaining multiple root key versions, and the two-phase sending of SSFS information in steps 306 and 324 can ensure that no root key is lost in any situation.

Figure 4:
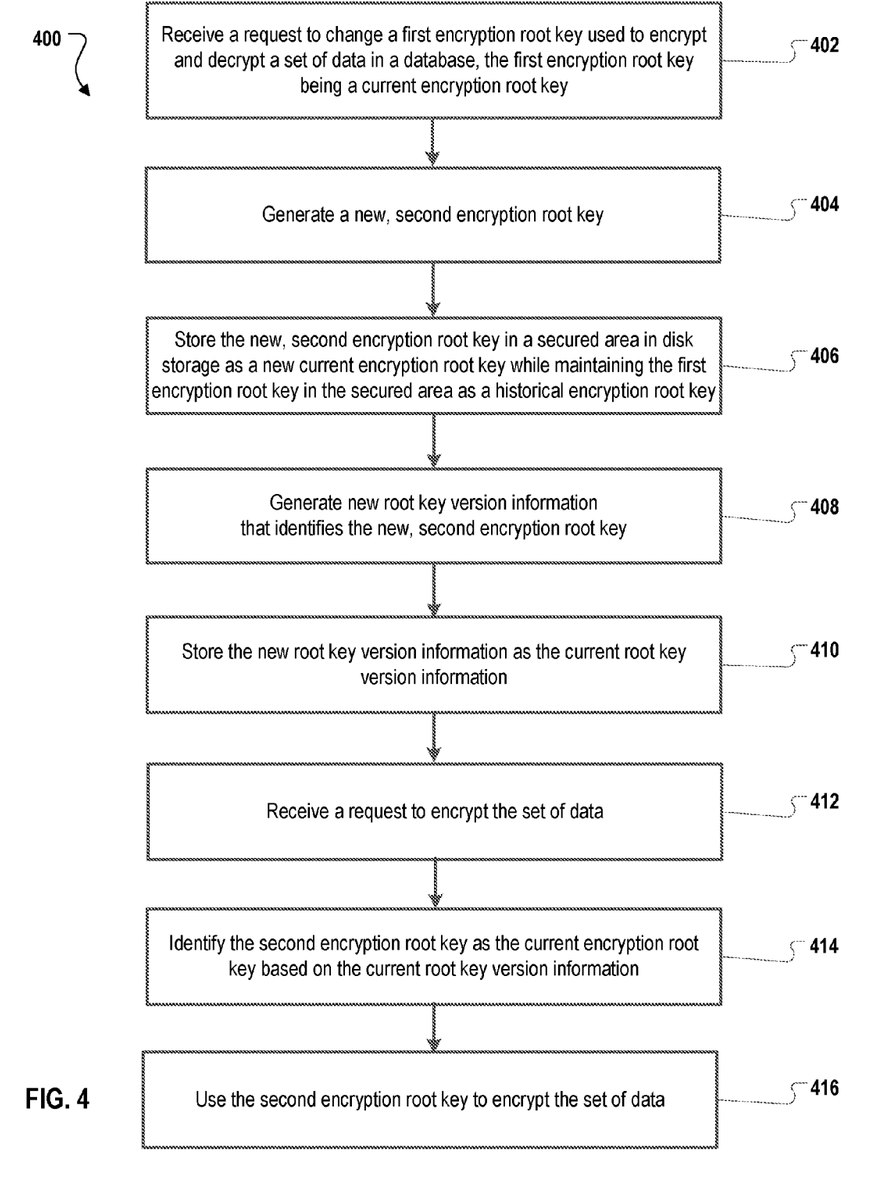
FIG. 4 is a flowchart illustrating an example method for performing an online change of an encryption root key in a distributed database system, according to an implementation.

FIG. 4 is a flowchart illustrating an example method 400 for performing an online change of an encryption root key in a distributed database system, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402, a request is received to change a first encryption root key used to encrypt a set of data in a database. The first encryption root key is a current encryption root key. From 402, method 400 proceeds to 404.

At 404, a new, second encryption root key is generated. From 404, method 400 proceeds to 406.

At 406, the new, second encryption root key is stored in a secured area in disk storage as a new current encryption root key while maintaining the first encryption root key in the secured area as a historical encryption root key. The secured area can be separate from a disk storage area used to store database data. From 406, method 400 proceeds to 408.

At 408, new root key version information that identifies the new, second encryption root key is generated. The new root key version information is different than current root key version information that identifies the first encryption root key. From 408, method 400 proceeds to 410.

At 410, the new root key version information is stored as the current root key version information. From 410, method 400 proceeds to 412.

At 412, a request to encrypt the set of data is received. From 412, method 400 proceeds to 414.

At 414, the second encryption root key is identified as the current encryption root key based on the current root key version information. From 414, method 400 proceeds to 416.

At 416, the second encryption root key is used to encrypt the set of data to create an encrypted set of data. From 420, method 400 stops.

Figure 5:
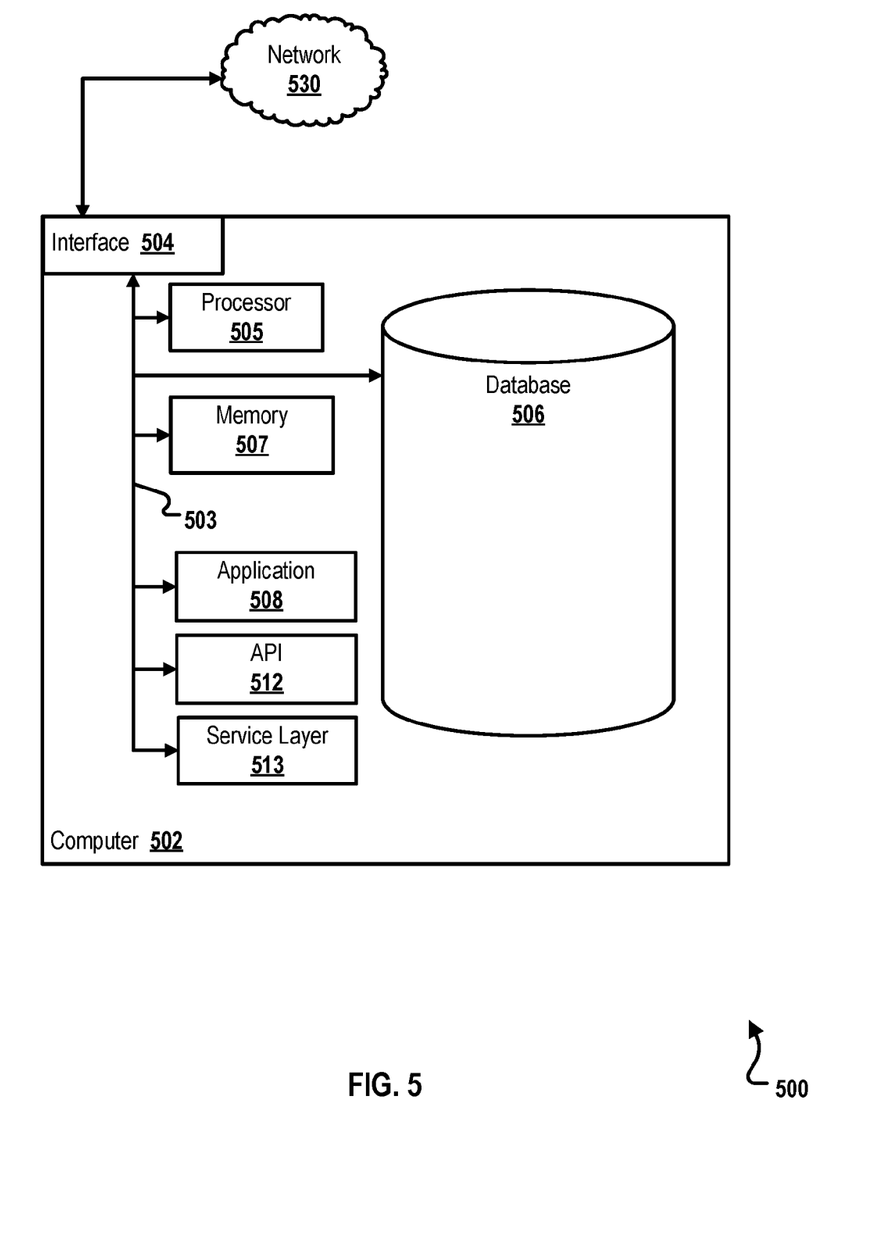
FIG. 5 is a block diagram illustrating an exemplary computer used in the EDCS, according to an implementation.

FIG. 5 is a block diagram illustrating an exemplary computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530 (whether illustrated or not). Generally, the interface 504 comprises logic encoded in software or hardware (or a combination of software and hardware) and operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, applications, etc. Further, although illustrated as a single application 508, the application 508 may be implemented as multiple applications 507 on the computer 502. In addition, although illustrated as integral to the computer 502, in alternative implementations, the application 508 can be external to the computer 502.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method includes: receiving a request to change a first encryption root key used to encrypt and decrypt a set of data in a database, the first encryption root key being a current encryption root key; generating a new, second encryption root key; storing the new, second encryption root key in a secured area in disk storage as a new current encryption root key while maintaining the first encryption root key in the secured area as a historical encryption root key; generating new root key version information that identifies the new, second encryption root key, wherein the new root key version information is different than current root key version information that identifies the first encryption root key; storing the new root key version information as the current root key version information; receiving a request to encrypt the set of data; identifying the second encryption root key as the current encryption root key based on the current root key version information; and using the second encryption root key to encrypt the set of data to create an encrypted set of data.

The foregoing and other described implementations can each optionally include one or more of the following features:

A first feature, combinable with any of the following features, comprising storing consistency information for the new, second encryption root key in the database and using the consistency information for checking consistency of the secured area.

A second feature, combinable with any of the previous or following features, wherein the consistency information is used for checking consistency of the secured area upon startup of the database, backup of the database, or in association with a periodic consistency check.

A third feature, combinable with any of the previous or following features, comprising: receiving a request to decrypt the encrypted set of data; identifying the second encryption root key as the current encryption root key based on the current root key version information; and using the second encryption root key to decrypt the encrypted set of data to generate a first decrypted set of data.

A fourth feature, combinable with any of the previous or following features, comprising performing a first checksum operation on the first decrypted set of data to validate the first decrypted set of data.

A fifth feature, combinable with any of the previous or following features, comprising: determining that the first checksum operation has failed; identifying one or more non-current encryption root keys in the secured area other than the current encryption root key; and using respective non-current encryption root keys to attempt to successfully decrypt the encrypted set of data until either a non-current encryption root key successfully decrypts the encrypted set of data or all non-current encryption root keys have been unsuccessfully used.

A sixth feature, combinable with any of the previous or following features, wherein the non-current encryption root keys include one or more historical encryption root keys, including the first encryption root key, that are older than the current encryption root key.

A seventh feature, combinable with any of the previous or following features, wherein the set of data is a key page that includes page encryption keys used to encrypt and decrypt pages of database data.

An eighth feature, combinable with any of the previous or following features, wherein the database is hosted by a primary server and is connected to one or more secondary servers, the method further comprising propagating the new, second encryption root key to the one or more secondary servers.

A ninth feature, combinable with any of the previous or following features, wherein storing the new root key version information comprises storing the new root key version information after receiving an acknowledgement that the one or more secondary servers have received the new, second encryption root key.

A tenth feature, combinable with any of the previous or following features, comprising propagating the new root key version information to the one or more secondary servers.

An eleventh feature, combinable with any of the previous or following features, wherein the non-current encryption root keys include a third encryption root key that is newer than the current encryption root key, the third encryption root key being an encryption root key propagated to a secondary server and restored to the primary server from the secondary server after a crash of the primary server.

A twelfth feature, combinable with any of the previous or following features, comprising: performing, at a first time, a backup of the database, including storing, in the backup, encryption root key information from the secured area; and performing, at a second time, a restore procedure using the backup, including storing, in the secured area, the encryption root key information included in the backup.

In a second implementation, a non-transitory, computer-readable medium stores computer-readable instructions. The instructions are executable by a computer and configured to: receive a request to change a first encryption root key used to encrypt and decrypt a set of data in a database, the first encryption root key being a current encryption root key; generate a new, second encryption root key; store the new, second encryption root key in a secured area in disk storage as a new current encryption root key while maintaining the first encryption root key in the secured area as a historical encryption root key; generate new root key version information that identifies the new, second encryption root key, wherein the new root key version information is different than current root key version information that identifies the first encryption root key; store the new root key version information as the current root key version information; receive a request to encrypt the set of data; identify the second encryption root key as the current encryption root key based on the current root key version information; and use the second encryption root key to encrypt the set of data to create an encrypted set of data.

The foregoing and other described implementations can each optionally include one or more of the following features:

A first feature, combinable with any of the following features, comprising storing consistency information for the new, second encryption root key in the database and using the consistency information for checking consistency of the secured area.

A second feature, combinable with any of the previous or following features, wherein the consistency information is used for checking consistency of the secured area upon startup of the database, backup of the database, or in association with a periodic consistency check.

A third feature, combinable with any of the previous or following features, comprising: receiving a request to decrypt the encrypted set of data; identifying the second encryption root key as the current encryption root key based on the current root key version information; and using the second encryption root key to decrypt the encrypted set of data to generate a first decrypted set of data.

A fourth feature, combinable with any of the previous or following features, comprising performing a first checksum operation on the first decrypted set of data to validate the first decrypted set of data.

A fifth feature, combinable with any of the previous or following features, comprising: determining that the first checksum operation has failed; identifying one or more non-current encryption root keys in the secured area other than the current encryption root key; and using respective non-current encryption root keys to attempt to successfully decrypt the encrypted set of data until either a non-current encryption root key successfully decrypts the encrypted set of data or all non-current encryption root keys have been unsuccessfully used.

A sixth feature, combinable with any of the previous or following features, wherein the non-current encryption root keys include one or more historical encryption root keys, including the first encryption root key, that are older than the current encryption root key.

A seventh feature, combinable with any of the previous or following features, wherein the set of data is a key page that includes page encryption keys used to encrypt and decrypt pages of database data.

An eighth feature, combinable with any of the previous or following features, wherein the database is hosted by a primary server and is connected to one or more secondary servers, the method further comprising propagating the new, second encryption root key to the one or more secondary servers.

A ninth feature, combinable with any of the previous or following features, wherein storing the new root key version information comprises storing the new root key version information after receiving an acknowledgement that the one or more secondary servers have received the new, second encryption root key.

A tenth feature, combinable with any of the previous or following features, comprising propagating the new root key version information to the one or more secondary servers.

An eleventh feature, combinable with any of the previous or following features, wherein the non-current encryption root keys include a third encryption root key that is newer than the current encryption root key, the third encryption root key being an encryption root key propagated to a secondary server and restored to the primary server from the secondary server after a crash of the primary server.

A twelfth feature, combinable with any of the previous or following features, comprising: performing, at a first time, a backup of the database, including storing, in the backup, encryption root key information from the secured area; and performing, at a second time, a restore procedure using the backup, including storing, in the secured area, the encryption root key information included in the backup.

In a third implementation, a system comprises a memory and at least one hardware processor interoperably coupled with the memory. The at least one hardware processor is configured to: receive a request to change a first encryption root key used to encrypt and decrypt a set of data in a database, the first encryption root key being a current encryption root key; generate a new, second encryption root key; store the new, second encryption root key in a secured area in disk storage as a new current encryption root key while maintaining the first encryption root key in the secured area as a historical encryption root key; generate new root key version information that identifies the new, second encryption root key, wherein the new root key version information is different than current root key version information that identifies the first encryption root key; store the new root key version information as the current root key version information; receive a request to encrypt the set of data; identify the second encryption root key as the current encryption root key based on the current root key version information; and use the second encryption root key to encrypt the set of data to create an encrypted set of data.

The foregoing and other described implementations can each optionally include one or more of the following features:

A first feature, combinable with any of the following features, comprising storing consistency information for the new, second encryption root key in the database and using the consistency information for checking consistency of the secured area.

A second feature, combinable with any of the previous or following features, wherein the consistency information is used for checking consistency of the secured area upon startup of the database, backup of the database, or in association with a periodic consistency check.

A third feature, combinable with any of the previous or following features, comprising: receiving a request to decrypt the encrypted set of data; identifying the second encryption root key as the current encryption root key based on the current root key version information; and using the second encryption root key to decrypt the encrypted set of data to generate a first decrypted set of data.

A fourth feature, combinable with any of the previous or following features, comprising performing a first checksum operation on the first decrypted set of data to validate the first decrypted set of data.

A fifth feature, combinable with any of the previous or following features, comprising: determining that the first checksum operation has failed; identifying one or more non-current encryption root keys in the secured area other than the current encryption root key; and using respective non-current encryption root keys to attempt to successfully decrypt the encrypted set of data until either a non-current encryption root key successfully decrypts the encrypted set of data or all non-current encryption root keys have been unsuccessfully used.

A sixth feature, combinable with any of the previous or following features, wherein the non-current encryption root keys include one or more historical encryption root keys, including the first encryption root key, that are older than the current encryption root key.

A seventh feature, combinable with any of the previous or following features, wherein the set of data is a key page that includes page encryption keys used to encrypt and decrypt pages of database data.

An eighth feature, combinable with any of the previous or following features, wherein the database is hosted by a primary server and is connected to one or more secondary servers, the method further comprising propagating the new, second encryption root key to the one or more secondary servers.

A ninth feature, combinable with any of the previous or following features, wherein storing the new root key version information comprises storing the new root key version information after receiving an acknowledgement that the one or more secondary servers have received the new, second encryption root key.

A tenth feature, combinable with any of the previous or following features, comprising propagating the new root key version information to the one or more secondary servers.

An eleventh feature, combinable with any of the previous or following features, wherein the non-current encryption root keys include a third encryption root key that is newer than the current encryption root key, the third encryption root key being an encryption root key propagated to a secondary server and restored to the primary server from the secondary server after a crash of the primary server.

A twelfth feature, combinable with any of the previous or following features, comprising: performing, at a first time, a backup of the database, including storing, in the backup, encryption root key information from the secured area; and performing, at a second time, a restore procedure using the backup, including storing, in the secured area, the encryption root key information included in the backup.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
  receiving, at a primary master index server, a request to change a first encryption root key used to encrypt and decrypt a set of data in a database, the first encryption root key being a current encryption root key, wherein the primary master index server is connected to at least one secondary master index server associated with a replication of encryption root keys from the primary master index server to the at least one secondary master index server;
  generating, by the primary master index server, a new, second encryption root key;
  storing, by the primary master index server, the new, second encryption root key in a secured area in disk storage as a new current encryption root key while maintaining the first encryption root key in the secured area as a historical encryption root key, wherein the new, second encryption root key is set to an inactive state by the primary master index server until confirmation is received that the new, second encryption root key is received and stored at the at least one secondary master index server;
  propagating, by the primary master index server, the new, second encryption root key to the at least one secondary master index server; and
  in response to receiving confirmation at the primary master index server that the new, second encryption root key is received and stored at the at least one secondary master index server:
    generating new root key version information that identifies the new, second encryption root key, wherein the new root key version information is different than current root key version information that identifies the first encryption root key;
    storing the new root key version information as the current root key version information;
    updating, by the primary master index server, the stored new, second encryption root key to an active state in the secured area in disk storage;
    receiving a request to encrypt the set of data;
    identifying the second encryption root key as the current encryption root key based on the current root key version information; and
    using the second encryption root key to encrypt the set of data to create an encrypted set of data.

2. The method of claim 1, further comprising:
  storing consistency information for the new, second encryption root key in the database; and
  using the consistency information for checking consistency of the secured area.

3. The method of claim 2, wherein the consistency information is used for checking consistency of the secured area upon startup of the database, backup of the database, or in association with a periodic consistency check.

4. The method of claim 1, further comprising:
receiving a request to decrypt the encrypted set of data;
identifying the second encryption root key as the current encryption root key based on the current root key version information; and
using the second encryption root key to decrypt the encrypted set of data to generate a first decrypted set of data.

5. The method of claim 3, further comprising performing a first checksum operation on the first decrypted set of data to validate the first decrypted set of data.

6. The method of claim 5, further comprising:
determining that the first checksum operation has failed;
identifying one or more non-current encryption root keys in the secured area other than the current encryption root key; and
using respective non-current encryption root keys to attempt to successfully decrypt the encrypted set of data until either a non-current encryption root key successfully decrypts the encrypted set of data or all non-current encryption root keys have been unsuccessfully used.

7. The method of claim 6, wherein the non-current encryption root keys include one or more historical encryption root keys, including the first encryption root key, that are older than the current encryption root key.

8. The method of claim 1, wherein the set of data is a key page that includes page encryption keys used to encrypt and decrypt pages of database data.

9. The method of claim 1, wherein the non-current encryption root keys include a third encryption root key that is newer than the current encryption root key, the third encryption root key being an encryption root key propagated to a secondary server and restored to the primary server from the secondary server after a crash of the primary server.

10. The method of claim 1, further comprising:
performing, at a first time, a backup of the database, including storing, in the backup, encryption root key information from the secured area; and
performing, at a second time, a restore procedure using the backup, including storing, in the secured area, the encryption root key information included in the backup.

11. A non-transitory, computer-readable medium storing computer-readable instructions, the instructions executable by a computer and configured to:
receive, at a primary master index server, a request to change a first encryption root key used to encrypt and decrypt a set of data in a database, the first encryption root key being a current encryption root key, wherein the primary master index server is connected to at least one secondary master index server associated with a replication of encryption root keys from the primary master index server to the at least one secondary master index server;
generate, by the primary master index server, a new, second encryption root key;
store, by the primary master index server, the new, second encryption root key in a secured area in disk storage as a new current encryption root key while maintaining the first encryption root key in the secured area as a historical encryption root key, wherein the new, second encryption root key is set to an inactive state by the primary master index server until confirmation is received that the new, second encryption root key is received and stored at the at least one secondary master index server;
propagate, by the primary master index server, the new, second encryption root key to the at least one secondary master index server; and
in response to receiving confirmation at the primary master index server that the new, second encryption root key is received and stored at the at least one secondary master index server:
generate new root key version information that identifies the new, second encryption root key, wherein the new root key version information is different than current root key version information that identifies the first encryption root key;
store the new root key version information as the current root key version information;
update the stored new, second encryption root key to an active state in the secured area in disk storage;
receive a request to encrypt the set of data;
identify the second encryption root key as the current encryption root key based on the current root key version information; and
use the second encryption root key to encrypt the set of data to create an encrypted set of data.

12. The computer-readable medium of claim 11, wherein the instructions are configured to:
store consistency information for the new, second encryption root key in the database; and
use the consistency information for checking consistency of the secured area.

13. The computer-readable medium of claim 12, wherein the consistency information is used for checking consistency of the secured area upon startup of the database, backup of the database, or in association with a periodic consistency check.

14. The computer-readable medium of claim 11, wherein the set of data is a key page that includes page encryption keys used to encrypt and decrypt pages of database data.

15. A system, comprising:
a memory;
at least one hardware processor interoperably coupled with the memory and configured to:
receive, at a primary master index server, a request to change a first encryption root key used to encrypt and decrypt a set of data in a database, the first encryption root key being a current encryption root key, wherein the primary master index server is connected to at least one secondary master index server associated with a replication of encryption root keys from the primary master index server to the at least one secondary master index server;
generate, by the primary master index server, a new, second encryption root key;
store, by the primary master index server, the new, second encryption root key in a secured area in disk storage as a new current encryption root key while maintaining the first encryption root key in the secured area as a historical encryption root key, wherein the new, second encryption root key is set to an inactive state by the primary master index server until confirmation is received that new, second encryption root key is received and stored at the at least one secondary master index server;
propagate, by the primary master index server, the new, second encryption root key to the at least one secondary master index server; and
in response to receiving confirmation at the primary master index server that the new, second encryption root key is received and stored at the at least one secondary master index server:
- generate new root key version information that identifies the new, second encryption root key, wherein the new root key version information is different than current root key version information that identifies the first encryption root key;
- store the new root key version information as the current root key version information;
- update, by the primary master index server, the stored new, second encryption root key to an active state in the secured area in disk storage;
- receive a request to encrypt the set of data;
- identify the second encryption root key as the current encryption root key based on the current root key version information; and
- use the second encryption root key to encrypt the set of data to create an encrypted set of data.

16. The system of claim 15, wherein the instructions are configured to:
- store consistency information for the new, second encryption root key in the database; and
- use the consistency information for checking consistency of the secured area.

17. The system of claim 16, wherein the consistency information is used for checking consistency of the secured area upon startup of the database, backup of the database, or in association with a periodic consistency check.

* * * * *